Patented Nov. 17, 1953

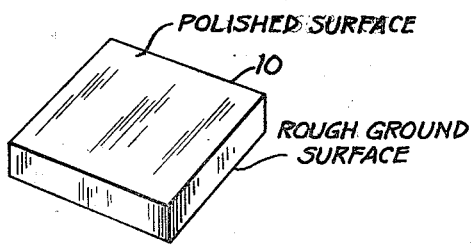
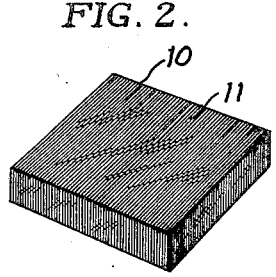
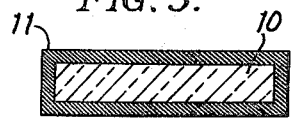
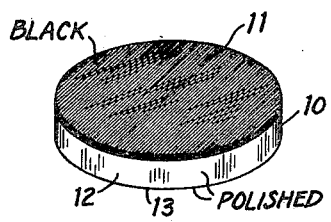
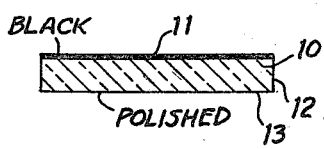
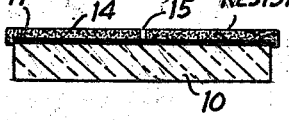
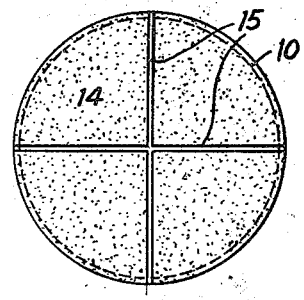
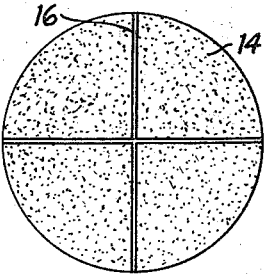
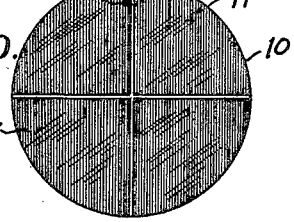

2,659,665

UNITED STATES PATENT OFFICE 2,659,665

RETICLES

William F. Parsons and Ezra C. Poling, Rochester, N. Y., assignors to Eastman Kodak Company, Rochester, N. Y., a corporation of New Jersey Application October 27, 1950, Serial No. 192,468

7 Claims. (Cl. 41—41)

This invention relates to improved reticles for optical systems and to methods for forming reticles or other designs on optical and other glass elements.

An object of this invention is to provide a reticle or design which is integral with a glass optical element or other glass article.

Another object of the invention is a method of forming an integral reticle or design on the surface of a glass optical element or other glass article.

A further object of the invention is a reticle or other glass article having an integral black surface with transparent reticle markings or designs therein, the black surface having a non-reflecting coating at the interface with the underlying clear glass.

Other objects will be apparent hereinafter.

In accordance with a broad conception of the invention these and other objects are attained by causing small opaque lead particles to be formed in a black layer near the surface of the glass element and then forming the desired reticle lines or other design on the leaded surface by any suitable engraving technique. By etching through the thin black opaque glass layer containing the small lead particles a transparent engraving is obtained on a black field. In effect, therefore, the reticle or design is an integral part of the optical element. Lead glass may be effectively employed in accomplishing our invention, however, other types of glass may be employed, if desired, by first placing a suitable lead coating on the surface of the glass and fusing it thereto, as will be described hereinafter. If, as in some optical applications, the reflection at the interface between the opaque layer and the clear underlying glass is too great, a layer of silver may be diffused into the surface of the glass before the reduced lead atoms are produced on the same surface. This operation will produce a non-reflecting coating at the black layer-clear glass interface.

In general, our invention can be carried out as follows. Sheets of flint glass, i. e. glass containing lead, are ground and polished on one side. The other side may have only a coarse grind. These glass sheets are placed in an oven on flat lava or other ceramic shelves. The glass rests on its ground side. Then the oven is closed and a hydrogen atmosphere is established in the oven. The oven is then heated to the required temperature for the required length of time to produce a desired density in the opaque layer. Glass thus treated has all of its surfaces blackened by the reduced lead particles which form near its surface. The coarse ground surface is then medium and fine ground and polished. The medium and fine grind remove the opaque layer from this side and when polished a transparent piece of glass results except for the thin black opaque layer on the opposite face of the glass on which the reticle or design is to be formed. Now the sheets of glass are cut and rounded to the desired size and shape. This glass is now ready for engraving. The glass is coated with the proper acid resisting layer such as a reticle wax, and the opaque side of the glass is engraved and etched by regular reticle engraving techniques. The etching results in removing the thin opaque glass layer leaving the transparent glass exposed. Of course, this etching only takes place when the glass has been exposed by the engraving procedure. Thus, the engraving produced in the wax is permanently recorded in the glass as transparent lines or designs on a black field.

Cross-sections of these reduced lead layers and also cross-sections of lines engraved in these layers have been studied under 100 power magnification. These studies have resulted in correlation between reducing conditions and the thickness of the reduced layer. Pertinent data are included in the following examples. It is desirable that there be sharp contrast between the black field and the transparent lines or designs and the acid, HF, etch must effectively cut a rectangular shaped furrow out of the glass. The studies of the cross-sections of the engraved lines show that the nature of the etch is such that sharp contrast results and the furrow etched is rectangular in its optical effect but may not be strictly rectangular in a geometric sense.

The layer of glass containing tiny particles of metallic lead has a glossy black appearance when one views the air-black glass interference, however, if one turns the glass over and views the transparent glass-black interface, it appears to be gray.

The invention will be further understood by reference to the following accompanying drawings in which:

Fig. 1 is a perspective view of a lens blank having a polished surface on one side and a rough ground surface on the opposite side.

Figs. 2 and 3 are respectively perspective and cross-sectional views of the lens in Fig. 1 after hydrogen reduction showing the black surfaces thereon.

Figs. 4 and 5 are respectively plan and cross-sectional views of the hydrogen reduced lens after it has been cut to shape and polished on the rough surface and edge;

Figs. 6 and 7 are respectively cross-sectional and plan views of the lens of Figs. 4 and 5 having an acid resist coating thereon on which a reticle has been engraved, and;

Figs. 8 and 9 are respectively cross-sectional and plan views of the lens of Figs. 6 and 7 after etching; and Fig. 10 is the finished reticle with the acid resist removed and having the black surface and reticle design thereon.

Both the black-air and the black-glass surfaces reflect considerable light. There are many applications where the reflection from one or both of these surfaces should be held at a minimum. The reflection from the air-black glass interface can be cut down by the regular non-reflecting coatings which may be applied, for example, in accordance with the procedures described in Cartwright et al. Patent Re. 22,076 of April 21, 1942. The reflection from the transparent glass-black glass interface may be made vanishingly small by the procedure described in the copending Parsons and Little application, Ser. No. 192,467 filed on even date herewith, entitled "Non-Reflecting Coatings on Glass." As there described, if a lead glass is stained by diffusing a coating of silver into the surface and the surface of the glass is then reduced under the proper conditions, the reflection from the internal interface is cut down to a desirable extent not heretofore attainable by ordinary blackening procedures. This coating has the added advantage of being able to withstand much greater extremes of temperature than black coatings prepared by coating the glass surface with known inks. The coating is stable up to the temperature that will oxidize the metallic lead in the glass surface. This temperature varies with the glass, but should preferably be at least above 500° F. The coating is also as resistant to abrasion and chemical action as the glass itself. Under any treatment to which a piece of optical glass is normally subjected the coating could be expected to hold up as long as the glass.

In producing these leaded silver coatings, conditions of temperature and length of heating were found to be somewhat critical and varied with the type of glass. Silver appears to diffuse into a glass by N+replacement in a linear, or approximately linear, gradation; the silver concentration being greater at the surface. The distance of diffusion depends on the concentration of silver applied to the surface and the time and temperature of diffusion. Too much heat during silver staining tends to coalesce the colloidal silver, forming a white precipitate in the glass surface. When this is reduced, the coating appears blue and the reflection is too high. If the silver is diffused too far into the surface the reflection is not diminished.

In producing such non-reflecting coatings it was found that good transparent yellow to amber silver staining was obtained on all lead glasses if the surface was chemically silvered and then the glass was heated in an oven in an oxygen-containing atmosphere at a temperature below the softening point of the glass until the desired depth of diffusion was reached. 1000° F. for 15 hours was satisfactory for Corning G-10 glass. For lower melting glasses 850° F. for 15 to 60 hours was used. If diffusion took place at the softening point of the glass, a turbid coating resulted with the possible formation of Liesegang rings.

750° F. was found to be the lowest practical reducing temperature for lead glasses, Corning G-10, DF-3, and Corning #8391. Best results were obtained by reducing in hydrogen for one hour at 850° F. A temperature above 900° F. was too high and the glass surface was disturbed.

The presence of silver in a lead glass causes the lead to be reduced at a lower temperature than that in a glass containing no silver. For instance, when a silver stained glass and a plain lead glass are reduced simultaneously in hydrogen for one hour at 700° F. the glass containing silver is found to be substantially more opaque. A longer reducing time does not produce the desired coating without silver. Since the depth of the diffused silver is critical and since silver was found to assist reduction, it appears the phenomenon of decreased reflection can be based on the premise that a graded interface of reduced lead is formed at the glass surface. That is, the concentration of lead atoms gradually decreases from the glass-air interface to the internal interface of the coating.

The practice of making reticles and similar articles having non-reflecting interfaces with lead glass can be carried out by employing the following steps (1) chemically silver, evaporate, or otherwise deposit silver on the glass surface to be coated. (2) Heat the glass in an oven at a temperature which will cause the silver to diffuse into the glass surface not yet coalesced. It is desirable when coating small pieces to place them in the oven on a polished lava block. The block and the glass can then be removed from the oven while hot thereby lessening the chance of cracking the glass. (3) Reduce the stained glass in an atmosphere of hydrogen for one hour at 850° F. For opaque layers of this type the engraving is carried out by procedures similar to those described above, only in this case the acid removes both the lead and silver layers leaving the transparent glass exposed.

The present invention will be further understood by reference to the following examples:

*Example 1*

DF-3 glass which had been polished on one face and ground on the other face was reduced in a hydrogen oven at 930° F. for 90 minutes. This time and temperature of reduction results in an exceedingly opaque layer of glass. In fact, it exceeds a density of 9. The thickness of this layer is approximately 0.01 mm. The reduction having been completed, the ground face was polished thus removing the opaque layer of glass on that surface. To the surface containing the reduced lead, a commercially available acid resist (reticle wax) consisting of several waxes was applied. The desired pattern was then engraved through the resist using a pantagraph. The lines were .0008" wide. The glass was then etched in the vapor of 60% HF acid for 5 seconds at 105° F. The resist was removed and the reticle soaked a few minutes in warm water to remove the lead fluoride ash from the etched lines. An opaque reticle with transparent lines .0008" wide resulted.

*Example 2*

DF-3 glass prepared as in Example 1 was reduced for 40 minutes at 950° F. The thickness of the layer of black glass resulting was 0.007 mm. This glass was treated exactly as in Example 1 only the glass was etched in the vapor of 60% HF acid for 3 seconds at 105° F. Lines 0.0008" wide resulted as in Example 1.

*Example 3*

DF-3 glass prepared as in Example 1 was reduced for 70 minutes at 930° F. Following the procedure of Example 1, lines 0.0047" were engraved. This glass was then etched for 5 seconds in 60% liquid HF acid at room temperature. Lines resulted in the glass which accurately reproduces those engraved in the resist.

*Example 4*

The polished surface of DF-3 glass which had been prepared as in Example 1 was chemically silvered, and the silver diffused into the glass by heating for 16 hours at 850° F. The glass was then reduced for 40 minutes at 950° F. and the ground face was polished thus removing the opaque layer of glass on that face. Resist was applied to the surface containing the reduced lead and diffused silver and engraved with lines 0.0008" wide. This glass was etched in the vapors of 60% HF acid for 5 seconds at 105° F. and the silver and lead fluoride ash removed by soaking in warm water. An opaque reticle with transparent lines resulted. On inspecting the transparent glass-black interface, it was found that substantially no light was reflected at this interface.

As shown in the drawings, lens 10 is shown in Fig. 1 with an upper polished surface and a lower rough ground surface. In Figs. 2 and 3 the lens in accordance with the invention has been hydrogen reduced and a black opaque coating 11 has been formed thereon. In Figs. 4 and 5 the lens 10 is shown cut to size and its edge 12 and lower surface 13 are optically polished leaving the opaque 11 on the upper surface. In Figs. 6 and 7 the lens 10 has been coated on the opaque surface 11 with an acid resist 14 and reticle design 15 has been cut therethrough. In Figs. 8 and 9 the design has been etched through the opaque at 16 to the underlying clear glass. Fig. 10 shows the completed reticle with reticle design 16 cut through the black opaque reduced lead 11.

As the examples indicate, the reduction of the glass can be varied with regard to temperature and time. Above a certain temperature, the glass is softened and the polished surface destroyed and below a certain temperature very little lead is reduced, and the density of the reduced layer of glass is very low. The etching depends on the thickness of the opaque layer.

It should be understood that any lead glass can be used. The lead glasses, such as EDF-3, which have a high percentage of lead, have different temperatures of reduction but are satisfactory materials for producing reticles. In addition, it is possible to start with base glasses which do not contain lead, flux lead into the surface to be etched, then proceed with reduction and engraving as described above. The procedure for fluxing lead into non-lead glasses is further described in the above-mentioned copending joint application Ser. No. 192,467 filed on even date herewith.

As theredescribed, under the proper conditions lead, deposited either as the metal or as a salt, can be fluxed into a non-lead glass surface at a temperature below the softening point of the glass. When the proper concentration of lead is employed for the type glass being coated, this layer of lead glass is quite stable, transparent, and free from cracks and bubbles. Conditions as to the amount of lead, temperature, and length of time of fluxing vary with the glass being coated.

Lead borate, lead acetate, powdered lead glass, evaporated lead, and chemically deposited lead sulfide may be employed as fluxing materials. A simple inexpensive way to produce this layer of lead glass on lead-free glass is to deposit an even coating of 300 mesh lead powder and then heat the glass at a temperature just below its softening point. 200 mesh powder may be used, but the smoothest surfaces are obtained with the finest powders.

In order to hold the lead powder firmly to the glass, the surface to be coated is covered with a thin film of light grease. A dilute solution of grease in benzene is applied by brushing, spraying, or other means, and this deposit is smoothed to a continuous film.

The glass article to be leaded is then placed on a rigid support and covered with a 2½ foot glass column of 3 inches in diameter. The lead powder is sieved at the top of the column and allowed to fall undisturbed through the air space and land at random on the object at the base. The purpose of the air column is to distribute the lead particles so that an extremely uniform coating of the desired depth is obtained. Areas on the article may be protected by employing any easily removable masking tape, a solution of cellulose acetate in acetone or other suitable materials. It is also possible to wipe the surfaces clean if they have become contaminated with lead. A concentration of lead of approximately 0.006±.003 gms./sq. cm. of surface gives the desired results on boro silicate and soda lime glasses, the actual concentration being determined by the glass composition.

This amount of lead was found to adhere well enough to the film of grease that a lens edge could be coated by rotating the lens without danger of the lead falling off the surface.

The lead-coated glass article is then placed, coated side up, on a lava block and heated in an oven at a temperature of approximately 1000° F. depending on the type of base glass, until the lead has completely disappeared from the surface. A normal firing time is 15 hours. The oven is cooled slightly and then the object is removed on the lava block. If complete firing occurred, the surface will be practically transparent and free from ripples. From this point the article is treated as a lead glass, and the silvering, diffusing, and reducing procedures are followed as described above.

If properly applied these coatings are as stable as those produced on a base lead glass and will withstand temperature extremes of 600° F. to −85° F. and are as resistant to chemical action and abrasion as any lead glass.

One advantage in the reticles made in accordance with the present invention is that designs can be produced having closed circular lines, or closed lines of any geometric shape whereas in the case of metal reticles having such designs, several strips of metal must remain unetched to prevent the portion surrounded by the closed lines from falling out of the metal sheet. Of course, another advantage of the reticles described in this respect is their permanence. There is no danger of bending or warping out of shape as in the case where metal reticles are employed, and the reticle is more resistant to abrasion than are reticles by other methods.

These reticles have application in many types of view finders and sights when a bright pattern is focused at infinity. The procedure described herein also adapts itself to production of certain types of gratings, slit systems, and diaphragms for optical systems.

As indicated above, this invention is also applicable for producing designs or scenes on lead glass panels, lead glass dishes, vases, goblets and other such articles. Such designs may be produced by reducing the surface of the article, coating the article with the acid resist wax, engraving the desired design in the wax and exposing the engraving to a hydrofluoric acid etch leaving the desired design or scene on the glass. By employing photosensitive resists, designs or scenes can be photographed on the glass by Transfax or a similar process, and the actual image developed on the glass by a hydrofluoric acid etch. In the following claims the term lead glass included non-lead glass on which lead has been fused to provide sufficient lead atoms so that when exposed to a reducing treatment an opaque black layer will be formed on the glass.

What we claim and desire to secure by Letters Patent of the United States is:

1. The method of producing a design on transparent lead glass and the like which comprises reducing the lead on and adjacent one surface of the glass to produce an opaque layer thereon and forming a design through the opaque layer to the unreduced clear glass thereunder.

2. The method of producing a reticle on transparent lead glass which comprises reducing the lead on and adjacent a surface of the glass to produce an opaque layer thereon, coating the surface with an acid resist, removing a portion of the acid resist to form a reticle design extending through the acid resist, and etching the resulting exposed reduced opaque layer until the design extends through to the unreduced glass.

3. The method of producing a reticle on transparent lead glass which comprises reducing the lead on the surfaces of the glass to produce an opaque layer thereon, removing the opaque layer from one portion of the glass to produce a transparent surface thereon, and forming a reticle design through the opaque layer on another surface of the glass to the unreduced clear glass thereunder.

4. The method of producing a reticle on transparent lead glass which comprises reducing the lead on and adjacent a surface of the glass to produce an opaque layer thereon, coating the surface with an acid resist, removing a portion of the acid resist to form a reticle design extending through the acid resist, etching the resulting exposed reduced opaque layer until the design extends through to the unreduced glass.

5. The method of producing a reticle on transparent lead glass which comprises reducing the lead on and adjacent a surface of the glass to produce an opaque layer thereon, coating the surface with an acid resist, removing a portion of the acid resist to form a reticle design extending through the acid resist, etching the resulting exposed reduced opaque layer until the design extends through to the unreduced glass, and grinding and polishing other surfaces of the glass to produce a desired curvature thereon.

6. The method of producing a reticle on transparent lead glass which comprises reducing the lead on and adjacent a surface of the glass to produce an opaque layer thereon, coating the surface with an acid resist, removing a portion of the acid resist to form a reticle design extending through the acid resist, etching the resulting exposed reduced opaque layer until the design extends through to the unreduced glass, and grinding and polishing the opposite surface of the glass to produce a desired surface thereon.

7. The method of producing a reticle on transparent lead glass which comprises reducing the lead on and adjacent a surface of the glass at a temperature of from 930 to 950° F. for 30 to 70 minutes, coating the surface with an acid resist, removing a portion of the acid resist to form a reticle design extending through the acid resist, etching the resulting exposed reduced opaque layer with vapor of HF acid at a temperature of from 100 to 105° F. until the design extends through to the unreduced glass and grinding and polishing an opposite side of the glass to produce a desired curvature thereon.

WILLIAM F. PARSONS.
EZRA C. POLING.

References Cited in the file of this patent

UNITED STATES PATENTS

| Number | Name | Date |
|---|---|---|
| 748,850 | Duncan | Jan. 5, 1904 |
| 2,043,025 | Wooles | June 2, 1936 |
| 2,154,454 | Joyce | Apr. 18, 1939 |
| 2,482,547 | Kerridge | Sept. 20, 1949 |
| 2,482,822 | Zaroodny | Sept. 27, 1949 |
| 2,529,703 | Nicoll | Nov. 14, 1950 |